(12) United States Patent
Xie et al.

(10) Patent No.: US 10,176,409 B2
(45) Date of Patent: Jan. 8, 2019

(54) METHOD AND APPARATUS FOR IMAGE CHARACTER RECOGNITION MODEL GENERATION, AND VERTICALLY-ORIENTED CHARACTER IMAGE RECOGNITION

(71) Applicant: BAIDU ONLINE NETWORK TECHNOLOGY (BEIJING) CO., LTD., Beijing (CN)

(72) Inventors: Shufu Xie, Beijing (CN); Hang Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 92 days.

(21) Appl. No.: 15/393,630

(22) Filed: Dec. 29, 2016

(65) Prior Publication Data

US 2018/0060704 A1     Mar. 1, 2018

(51) Int. Cl.
*G06K 9/66*     (2006.01)
*G06K 9/18*     (2006.01)
(Continued)

(52) U.S. Cl.
CPC ............ *G06K 9/66* (2013.01); *G06K 9/18* (2013.01); *G06T 3/4046* (2013.01); *G06T 3/60* (2013.01); *G06T 11/60* (2013.01)

(58) Field of Classification Search
USPC ......... 1/1; 358/537; 382/105, 118, 155, 157, 382/158, 161, 165, 182, 185, 190;
(Continued)

(56) References Cited

U.S. PATENT DOCUMENTS 5,031,225 A * 7/1991 Tachikawa ........... G06K 9/3208
                                                          382/185
5,903,884 A * 5/1999 Lyon ................... G06K 9/6255
                                                          382/155

(Continued)

FOREIGN PATENT DOCUMENTS

EP             3171354 A4 * 12/2017

*Primary Examiner* — Xuemei Chen
(74) *Attorney, Agent, or Firm* — Lathrop Gage LLP (57) ABSTRACT

Embodiments of the present disclosure disclose an image character recognition model generation method and apparatus, and a vertically-oriented character image recognition method and apparatus. The image character recognition model generation method includes: generating a rotated line character training sample, wherein the rotated line character training sample includes a rotated line character image and an expected character recognition result corresponding to the rotated line character image, and there is a difference of 90 degrees between character units in the rotated line character image and character units in a standard line character image; and training a set neural network by using the rotated line character training sample, to generate an image character recognition model. The technical solutions of the embodiments of the present disclosure overcome the technical defect that existing line character images cannot be directly used to train a vertically-oriented character image recognition model, thereby implementing the efficient recognition of vertically-oriented characters.

17 Claims, 7 Drawing Sheets

(51) Int. Cl.
*G06T 3/40* (2006.01)
*G06T 3/60* (2006.01)
*G06T 11/60* (2006.01)

(58) Field of Classification Search
USPC .......................................... 704/236; 707/739
See application file for complete search history.

(56) References Cited

U.S. PATENT DOCUMENTS

| | | | | |
|---|---|---|---|---|
| 6,064,767 A * | 5/2000 | Muir | .................... | G06K 9/6821 382/177 |
| 6,101,270 A * | 8/2000 | Takahashi | ............ | G06K 9/4628 382/158 |
| 6,134,525 A * | 10/2000 | Iwahashi | .............. | G06K 9/3283 704/236 |
| 6,480,621 B1 * | 11/2002 | Lyon | .................... | G06K 9/6256 382/157 |
| 6,804,414 B1 * | 10/2004 | Sakai | ................... | G06K 9/3208 358/488 |
| 7,567,730 B2 * | 7/2009 | Ohguro | ................ | G06K 9/3208 382/190 |
| 7,689,034 B2 * | 3/2010 | Terakawa | ........... | G06K 9/00248 382/118 |
| 8,340,430 B2 * | 12/2012 | Campbell | ............ | G06K 9/3208 382/190 |
| 8,442,351 B2 * | 5/2013 | Takahashi | ................. | G06T 7/74 358/537 |
| 8,457,408 B2 * | 6/2013 | Challa | ................... | G06K 9/3258 382/105 |
| 8,977,042 B2 * | 3/2015 | Huo | .................... | G06K 9/00409 382/161 |
| 9,087,337 B2 * | 7/2015 | Ho | ......................... | G06Q 30/02 |
| 9,330,070 B2 * | 5/2016 | Zaric | .................... | G06F 17/2223 |
| 9,367,736 B1 * | 6/2016 | Senechal | ............ | G06K 9/00463 |
| 9,465,985 B2 * | 10/2016 | Xia | ..................... | G06K 9/00436 |
| 9,552,527 B1 * | 1/2017 | Daher | ................... | G06K 9/3208 |
| 9,727,797 B2 * | 8/2017 | Jordan | ................. | G06K 9/3208 |
| 2003/0099395 A1 * | 5/2003 | Wang | ................. | G06K 9/00248 382/165 |
| 2005/0053282 A1 * | 3/2005 | Suen | ....................... | G06K 9/52 382/182 |
| 2015/0331929 A1 * | 11/2015 | El-Saban | .......... | G06F 17/30598 707/739 |
| 2016/0283814 A1 * | 9/2016 | Jin | ..................... | G06K 9/00456 |
| 2017/0364744 A1 * | 12/2017 | Savchenkov | ...... | G06K 9/00409 |

* cited by examiner

METHOD AND APPARATUS FOR IMAGE CHARACTER RECOGNITION MODEL GENERATION, AND VERTICALLY-ORIENTED CHARACTER IMAGE RECOGNITION

CROSS-REFERENCE TO RELATED APPLICATION

This application claims the priority of Chinese Patent Application No. 201610772101.X, entitled "Method And Apparatus For Image Character Recognition Model Generation, and Vertically-Oriented Character Image Recognition," filed on Aug. 30, 2016, the content of which is incorporated herein by reference in its entirety.

TECHNICAL FIELD

Embodiments of the present disclosure relate to the field of text recognition technology, and particularly to a method and apparatus for image character recognition model generation, and vertically-oriented character image recognition.

BACKGROUND

With the popularity of smart phones and portable devices, optical character recognition (OCR) is more widely used. It can be used to reduce or replace the complex text input. A user only needs to shoot an image containing text, and the text in the image can be recognized automatically by using the OCR technology, for subsequent processing (for example, search and translation).

Conventional OCR technologies include two categories. In the first category, a text line is segmented into a plurality of candidate text areas. Then each candidate text area is recognized using a trained single-character recognition engine (for example, a convolutional neural network), and a plurality of candidates is produced. Finally, the text line is decoded based on a language model and information such as the text recognition confidence level, to obtain an output. The second category includes popular techniques in recent years, it avoids the text segmentation module used in the techniques of the first category, and a character string output is obtained from a line image using a recursive neural network (RNN). The techniques in the second category are more advanced, through which a text string output can be directly obtained from line-level images.

However, in real situations, there are far more horizontal text lines than vertically-oriented text. Existing text line images cannot be directly used to train a vertically-oriented text recognition model. As a result, a large number of vertically-oriented text images need to be collected in order to ensure the recognition model training performance, wasting a lot of manpower and material resources.

SUMMARY

Accordingly, embodiments of the present disclosure provide an image character recognition model generation method and apparatus, and a vertically-oriented character image recognition method and apparatus, so as to overcome the technical defect that existing character line images cannot be directly used to train a vertically-oriented character recognition model.

According to a first aspect, an embodiment of the present disclosure provides provide an image character recognition model generation method, comprising:

generating a rotated line character training sample, the rotated line character training sample comprising a rotated line character image and an expected character recognition result corresponding to the rotated line character image, character units in the rotated line character image rotated by 90 degrees in relation to character units in a standard line character image;

training a set neural network by using the rotated line character training sample, to generate an image character recognition model.

According to a second aspect, an embodiment of the present disclosure provides a vertically-oriented character image recognition method, comprising:

rotating a to-be-recognized vertically-oriented character image as a whole by 90 degrees, to generate a rotated to-be-recognized image;

entering the rotated to-be-recognized image into an image character recognition model, the image character recognition model generated by training a set neural network model by using a rotated line character image training sample, the rotated line character training sample comprising a rotated line character image and an expected character recognition result corresponding to the rotated line character image, character units in the rotated line character image rotated by 90 degrees in relation to character units in a standard line character image; and determining a vertically-oriented character recognition result corresponding to the to-be-recognized vertically-oriented character image based on an output from the image character recognition model.

According to a third aspect, an embodiment of the present disclosure provides an image character recognition model generation apparatus, comprising:

a training sample generation module for generating a rotated line character training sample, the rotated line character training sample comprising a rotated line character image and an expected character recognition result corresponding to the rotated line character image, character units in the rotated line character image rotated by 90 degrees in relation to character units in a standard line character image; and an image character recognition model generation module for training a set neural network by using the rotated line character training sample, to generate an image character recognition model.

According to a fourth aspect, an embodiment of the present disclosure provides a vertically-oriented character image recognition apparatus, comprising:

a rotated to-be-recognized image generation module for rotating a to-be-recognized vertically-oriented character image as a whole by 90 degrees, to generate a rotated to-be-recognized image;

a rotated to-be-recognized image entering module for entering the rotated to-be-recognized image into an image character recognition model, the image character recognition model generated by training a set neural network model by using a rotated line character image training sample, the rotated line character training sample comprising a rotated line character image and an expected character recognition result corresponding to the rotated line character image, character units in the rotated line character image rotated by 90 degrees in relation to character units in a standard line character image; and a vertically-oriented character recognition result determining module for determining a vertically-oriented character recognition result corresponding to the to-be-recognized vertically-oriented character image based on an output from the image character recognition model.

The image character recognition model generation method and apparatus and the vertically-oriented character image recognition method and apparatus that are provided in the embodiments of the present disclosure, by first obtaining a rotated line character image, of which character units have a difference of 90 degrees to character units in a standard line character image, then generating a rotated line character training sample, training a set neural network to generate an image character recognition model, recognizing, by using the image character recognition model, a rotated to-be-recognized image that is obtained by rotating a to-be-recognized vertically-oriented character image as a whole by 90 degrees, and finally determining a vertically-oriented character recognition result corresponding to the to-be-recognized vertically-oriented character image based on an output from the image character recognition model, overcome the technical defect that existing line character images cannot be directly used to train a vertically-oriented character image recognition model, thereby implementing the efficient recognition of vertically-oriented characters.

DETAILED DESCRIPTION OF EMBODIMENTS

To make the objectives, technical solutions, and advantages of the present disclosure more comprehensible, specific embodiments of the present disclosure are further described below with reference to the accompanying drawings. It should be appreciated that the specific embodiments described herein are merely used for explaining the present disclosure and not used for limiting the present disclosure.

In addition, it should also be noted that for the ease of description, the accompanying drawings merely show the part related to the present disclosure rather than all the content. Before exemplary embodiments are described in further detail below, it should be noted that some exemplary embodiments are described as processing or methods depicted by flow charts. Although various operations (or steps) are described as sequential processing in the flow charts, some of the operations may be implemented in parallel, concurrently, or simultaneously. In addition, the order of the operations may be rearranged. The processing may be terminated when the corresponding operation is completed. However, the processing may further include additional steps that are not shown in the accompanying drawings. The processing may correspond to a method, function, procedure, subroutine, subprogram, and so on.

To facilitate understanding of the content hereinafter, the inventive idea of the embodiments of the present disclosure is briefly introduced first.

Generally, to implement the recognition of Chinese or Japanese contents included in images, an image character recognition model may be trained in advance. After training, the input of the image character recognition model is an image, and the output of the image character recognition model is a character string corresponding to the recognition result.

For example, after an image of a set picture format (for example, .jpg or .png) and containing characters "China" (in Chinese) is inputted to a trained image character recognition model, the output result of the model should be a Chinese character string "China."

Generally, because line character images and vertically-oriented character image coexist, different image character recognition models need to be trained separately for the line character images and the vertically-oriented character images during image character recognition model training. The so-called line character image specifically refers to that characters in the image are horizontally arranged; the so-called vertically-oriented character image refers to that characters in the image are vertically arranged.

Therefore, to train corresponding image character recognition models, a large number of training samples need to be annotated in advance. The training sample includes: a line character or vertically-oriented character image, and an expected character recognition result corresponding to the image (a character string accurately corresponding to the image).

Generally, because there are many line character images on the Internet, a large number of training samples for the image character recognition model of line character images already exist. Normally, if training samples need to be generated for the image character recognition model for vertically-oriented character images, a large number of vertically-oriented character images need to be annotated. The main technical problem of this implementation solution lies in that the number of vertically-oriented text images on the Internet is small and considerable manpower and material costs are required.

The embodiments of the present disclosure provide a technical solution of using existing training samples for the image character recognition model for line text images as training samples for the image character recognition model for vertically-oriented text images by performing simple processing on the existing training samples.

Specifically, a vertically-oriented text image may be considered to be a special line text image after the vertically-oriented text image as a whole is rotated by 90 degrees. In such line text images, each character is rotated by 90 degrees with respect to standard characters. Therefore, the key inventive step of the present application is to convert existing line text image training samples into images in which all characters are rotated by 90 degrees, so as to use the converted images as training samples for the image character recognition model for vertically-oriented text images.

First Embodiment

Figure 1:
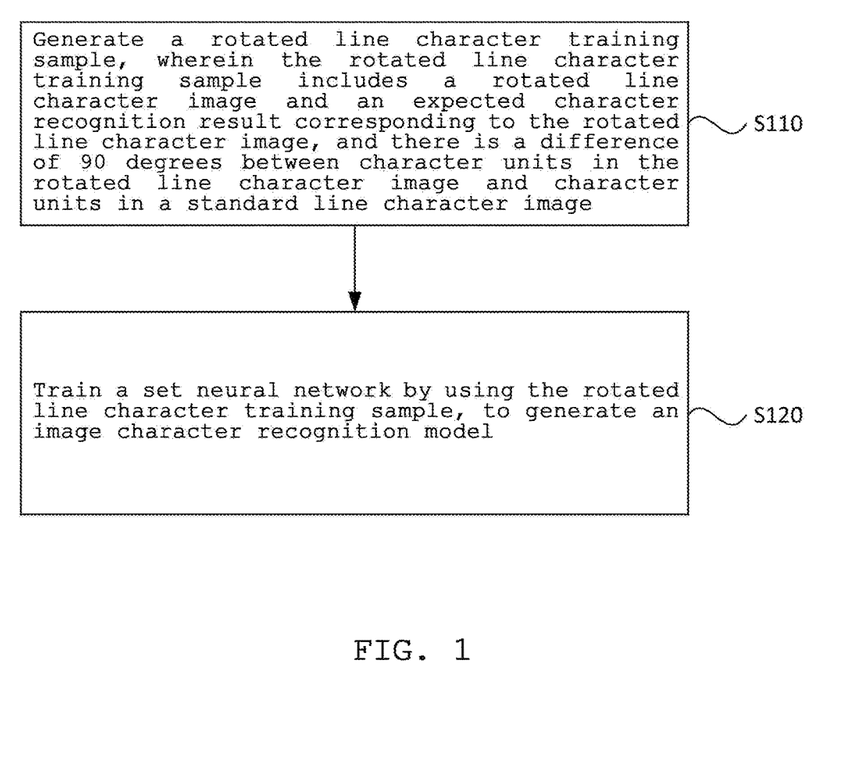
FIG. 1 is a flow chart of an image character recognition model generation method according to a first embodiment of the present disclosure.

FIG. 1 is a flow chart of an image character recognition model generation method according to a first embodiment of the present disclosure. The method of this embodiment may be executed by an image character recognition model generation apparatus. The apparatus may be implemented through hardware and/or software, and may generally be integrated in a device for performing image character recognition, for example, a smart phone, a computer, or a tablet, which is not limited in this embodiment.

The method of this embodiment specifically includes the following steps:

110. Generate a rotated line character training sample, wherein the rotated line character training sample includes a rotated line character image and an expected character recognition result corresponding to the rotated line character image, and there is a difference of 90 degrees between character units in the rotated line character image and character units in a standard line character image.

In this embodiment, the standard line character image specifically refers to an image including one or more horizontally arranged character units.

The character units may specifically be Chinese characters, Japanese characters, English letters, numerals, or the like.

Generally, because Chinese and Japanese characters are often vertically arranged, the method of this embodiment is mainly applicable to the recognition of vertically-oriented character images based on Chinese and Japanese characters. In addition, if a vertically-oriented character image to be recognized includes one or more English letters or numerals that exist alone, the recognition may also be performed by using the method of this embodiment of the present disclosure.

For example, if there are characters "Smooth sailing" (four characters, in Chinese) in a standard line character image, the standard line character image includes four character units, namely, "(Chinese Character 1)", "(Chinese Character 2)", "(Chinese Character 3)", and "(Chinese Character 4)."

The standard line character image may specifically be selected from existing standard line character image samples, generated by a horizontally-oriented character picture generation tool, or acquired in other manners, which is not limited in this embodiment.

In this embodiment, the rotated line character image may specifically be obtained by changing the standard line character image to a certain extent, obtained by rotating a standard vertically-oriented character image by 90 degrees, or obtained in other manners, which is not limited in this embodiment.

The standard vertically-oriented character image may specifically be selected from existing standard vertically-oriented character image samples, generated by a vertically-oriented character picture generation tool, or acquired in other manners, which is not limited in this embodiment. Further, rotating the standard vertically-oriented character image by 90 degrees specifically refers to rotating the standard vertically-oriented character image clockwise or anticlockwise by 90 degrees, which is not limited in this embodiment.

Changing the standard line character image to a certain extent may specifically be rotating all character units included in the standard line character image clockwise or anticlockwise by 90 degrees.

Correspondingly, the expected character recognition result corresponding to the rotated line character image may specifically be an expected character recognition result corresponding to the standard line character image or an expected character recognition result corresponding to the standard vertically-oriented character image. Further, when the standard line character image is specifically selected from existing standard line character image samples, the expected character recognition result corresponding to the standard line character image is a character recognition result corresponding to the existing standard line character image sample; when the standard line character image is specifically generated by a horizontally-oriented character picture generation tool, the expected character recognition result corresponding to the standard line character image is a result obtained by horizontally arranging in sequence the characters inputted to the horizontally-oriented character picture generation tool. Likewise, the expected character recognition result corresponding to the standard vertically-oriented character image is determined in a manner similar to that in which the expected character recognition result corresponding to the standard line character image is determined.

120. Train a set neural network by using the rotated line character training sample, to generate an image character recognition model.

In this embodiment, the set neural network may specifically be a recursive neural network or a convolutional neural network (CNN), which is not limited in this embodiment.

In this embodiment, the training the set neural network specifically refers to entering the rotated line character image in the rotated line character training sample to the set neural network, and adjusting the structure (for example, weight) of the set neural network by using a particular algorithm, so that the output of the set neural network conforms with the expected character recognition result corresponding to the rotated line character image. The particular algorithm specifically refers to an algorithm for adjusting the structure of the set neural network that is nested inside the set neural network.

The character units in the rotated line character image in the rotated line character training sample, either obtained by rotating the character units in the standard line character image clockwise by 90 degrees or obtained by rotating the character units in the standard line character image anticlockwise by 90 degrees, can be used to train a same set neural network, so as to adjust the structure of the neural network. That is, the training effect of the set neural network is not affected by the manner in which the rotated line character image is obtained.

Correspondingly, the image character recognition model specifically refers to a trained set neural network that is obtained by training the set neural network by using the rotated line character training sample.

The image character recognition model generation method that is provided in this embodiment of the present disclosure, by first generating a rotated line character image, of which character units have a difference of 90 degrees from character units in a standard line character image, then obtaining a rotated line character image training sample, and training a set neural network to generate an image character recognition model that can be used for recognizing a vertically-oriented character image, overcomes the technical defect that existing line character images cannot be directly used to train a vertically-oriented character image recognition model, thereby implementing the efficient recognition of vertically-oriented characters.

Second Embodiment

Figure 2A:
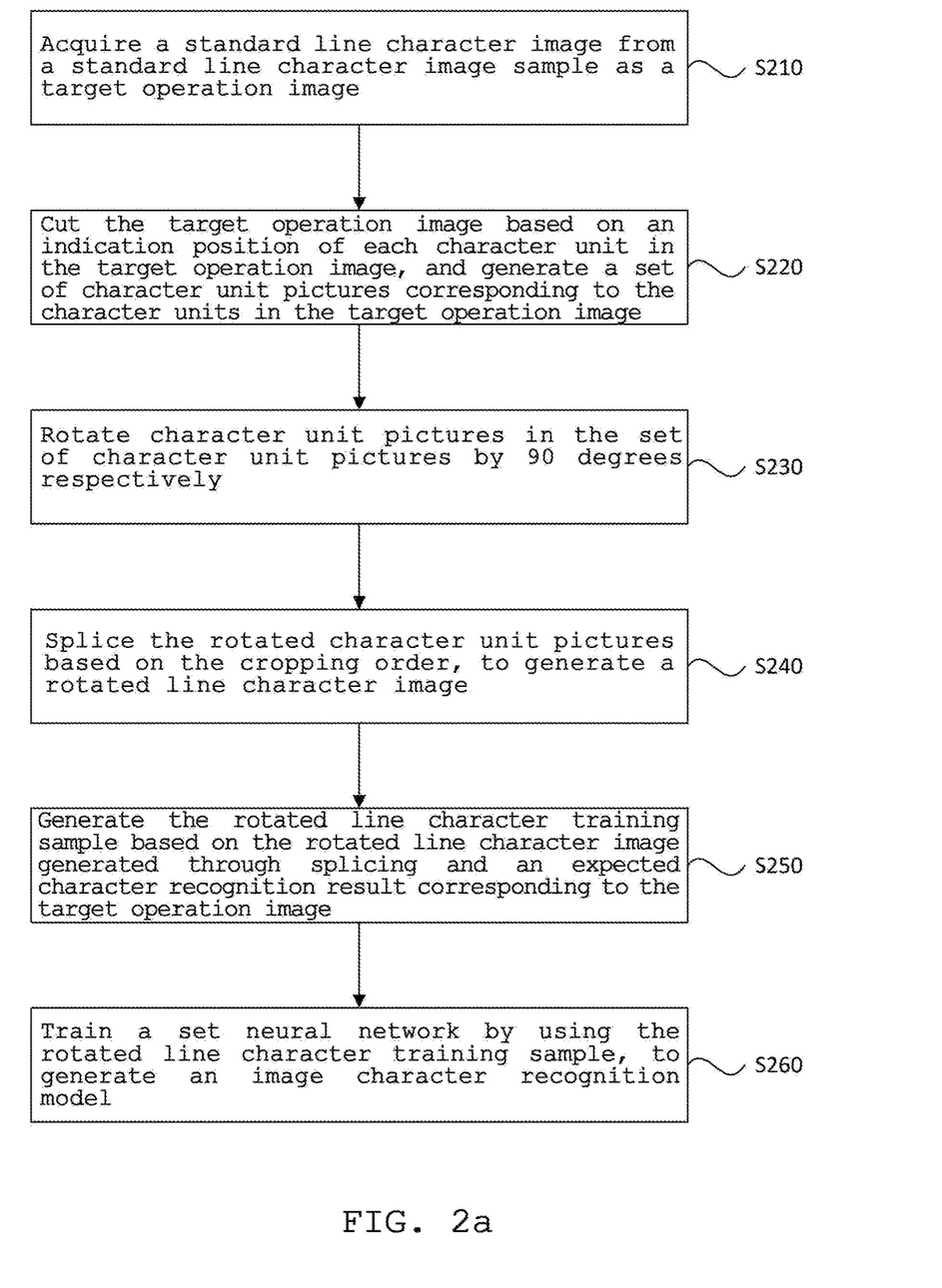
FIG. 2a is a flow chart of an image character recognition model generation method according to a second embodiment of the present disclosure.

FIG. 2a is a flow chart of an image character recognition model generation method according to a second embodiment of the present disclosure. This embodiment is an improvement on the above-mentioned embodiment. In this embodiment, preferably, the generating a rotated line character training sample specifically includes: acquiring a standard line character image from a standard line character image sample as a target operation image; cropping the target operation image based on an indication position of each character unit in the target operation image, and generating a set of character unit pictures corresponding to the character units in the target operation image; rotating character unit pictures in the set of character unit pictures by 90 degrees respectively; splicing the rotated character unit pictures based on the cropping order, to generate a rotated line character image; and generating the rotated line character training sample based on the rotated line character image generated through splicing and an expected character recognition result corresponding to the target operation image.

Correspondingly, the method of this embodiment specifically includes the following steps:

210. Acquire a standard line character image from a standard line character image sample as a target operation image.

In this embodiment, the standard line character image sample specifically refers to a sample consisting of an image including one or more horizontally arranged character units and a character recognition result corresponding to the image. Further, the standard line character image sample may specifically be a standard line character image sample consisting of a standard line character image sample downloaded from the Internet or a standard line character image generated by a horizontally-oriented character picture generation tool and corresponding input characters, which is not limited in this embodiment.

Figure 2B:
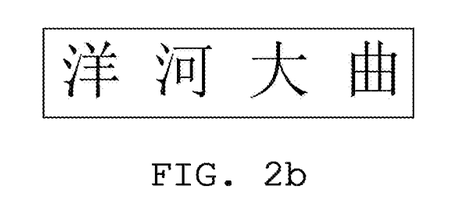
FIG. 2b is an exemplary diagram of a target operation image according to the second embodiment of the present disclosure.

Correspondingly, the target operation image specifically refers to the standard line character image in the standard line character image sample, as shown in FIG. 2b.

220. Cut the target operation image based on an indication position of each character unit in the target operation image, and generate a set of character unit pictures corresponding to the character units in the target operation image.

In this embodiment, the indication position of the character unit may specifically be specific pixel positions of four vertices of the character unit in the target operation image. It should be appreciated by those skilled in the art that in an image used as a neural network training sample, in addition to annotating in advance the character recognition result corresponding to the image, preferably, the position of the each character unit in the image may further be annotated in advance.

Figure 2C:
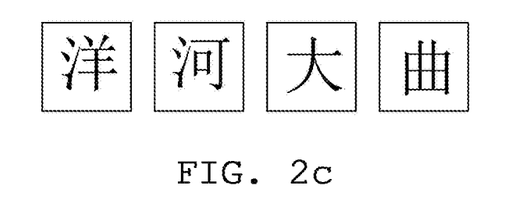
FIG. 2c is an exemplary diagram of a set of character unit pictures according to the second embodiment of the present disclosure.

In this embodiment, the cropping the target operation image specifically refers to cropping the target operation image based on the indication position of each character unit in the target operation image, to finally obtain a set of character unit pictures, as shown in FIG. 2c.

230. Rotate character unit pictures in the set of character unit pictures by 90 degrees respectively.

Figure 2D:
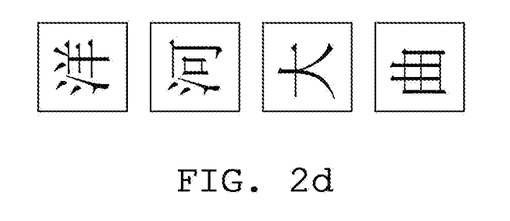
FIG. 2d is an exemplary diagram of rotation of a character unit picture according to the second embodiment of the present disclosure.

In this embodiment, the rotating character unit pictures in the set of character unit pictures by 90 degrees may specifically be rotating all the character unit pictures clockwise or anticlockwise by 90 degrees, which is not limited in this embodiment. FIG. 2d shows a rotated set of character unit pictures obtained by rotating all the character unit pictures in FIG. 2c anticlockwise by 90 degrees.

240. Splice the rotated character unit pictures based on the cropping order, to generate a rotated line character image.

Figure 2E:
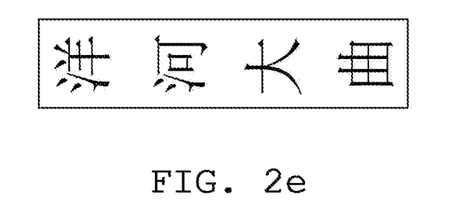
FIG. 2e is an exemplary diagram of a rotated line character image according to the second embodiment of the present disclosure.

FIG. 2e shows a rotated line character image obtained by splicing the rotated character unit pictures in FIG. 2d based on the cropping order.

250. Generate the rotated line character training sample based on the rotated line character image generated through splicing and an expected character recognition result corresponding to the target operation image.

In this embodiment, the expected character recognition result corresponding to the target operation image specifically refers to a character recognition result corresponding to the standard line character image in the standard line character image sample.

In this embodiment, the rotated line character training sample specifically refers to a sample consisting of the rotated line character image and the expected character recognition result corresponding to the target operation image.

260. Train a set neural network by using the rotated line character training sample, to generate an image character recognition model.

The image character recognition model generation method that is provided in this embodiment of the present disclosure, by first acquiring a standard line character image from a standard line character image sample as a target operation image, then cropping the target operation image based on an indication position of each character unit in the target operation image, generating a set of character unit pictures corresponding to the character units in the target operation image, rotating character unit pictures in the set of character unit pictures by 90 degrees respectively, splicing the rotated character unit pictures based on the cropping order to generate a rotated line character image, generating the rotated line character training sample based on the rotated line character image generated through splicing and an expected character recognition result corresponding to the target operation image, and finally training a set neural network by using the rotated line character training sample to generate an image character recognition model that can be used for recognizing a vertically-oriented character image, overcomes the technical defect that existing line character images cannot be directly used to train a vertically-oriented character image recognition model, thereby implementing the efficient recognition of vertically-oriented characters.

Further, on the basis of a recognition framework for line-level images, an image character recognition model for vertically-oriented character images can be obtained through training by using existing standard line character image samples and a network model designed based on text lines, so that the efficient recognition of vertically-oriented character units can be implemented without introducing great manpower and material costs.

Third Embodiment

Figure 3A:
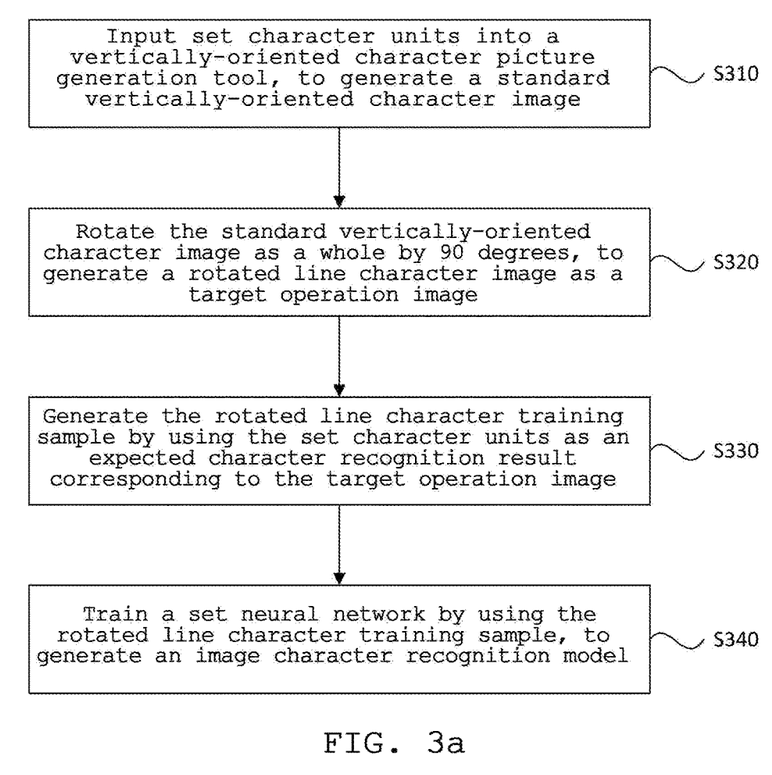
FIG. 3a is a flow chart of an image character recognition model generation method according to a third embodiment of the present disclosure.

FIG. 3a is a flow chart of an image character recognition model generation method according to a third embodiment of the present disclosure. This embodiment is an improvement on the above-mentioned embodiment. In this embodiment, preferably, the generating a rotated line character training sample specifically includes: entering set character units into a vertically-oriented character picture generation tool, to generate a standard vertically-oriented character image; rotating the standard vertically-oriented character image as a whole by 90 degrees, to generate a rotated line character image as a target operation image; and generating the rotated line character training sample by using the set character units as an expected character recognition result corresponding to the target operation image.

Correspondingly, the method of this embodiment specifically includes the following steps:

310. Input set character units into a vertically-oriented character picture generation tool, to generate a standard vertically-oriented character image.

In this embodiment, the set character units may specifically be Chinese characters, Japanese characters, English letters, or numerals, which is not limited in this embodiment.

In this embodiment, the vertically-oriented character picture generation tool specifically refers to a tool that can generate a corresponding vertically-oriented picture based on characters inputted and the input sequence of the characters.

Figure 3B:
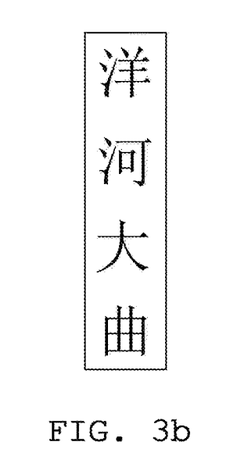
FIG. 3b is an exemplary diagram of a standard vertically-oriented character image according to the third embodiment of the present disclosure.

FIG. 3b is an exemplary diagram of a standard vertically-oriented character image.

320. Rotate the standard vertically-oriented character image as a whole by 90 degrees, to generate a rotated line character image as a target operation image.

Figure 3C:
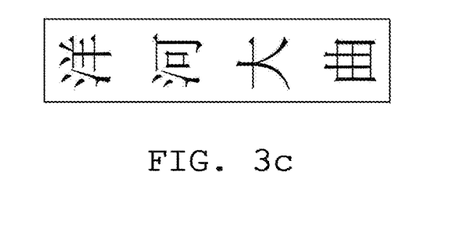
FIG. 3c is an exemplary diagram of a rotated line character image according to the third embodiment of the present disclosure.

In this embodiment, the rotating the standard vertically-oriented character image as a whole by 90 degrees may specifically be rotating the standard vertically-oriented character image clockwise or anticlockwise by 90 degrees, which is not limited in this embodiment. After FIG. 3b is rotated anticlockwise by 90 degrees, a rotated line character image shown in FIG. 3c is obtained.

330. Generate the rotated line character training sample by using the set character units as an expected character recognition result corresponding to the target operation image.

In this embodiment, the rotated line character training sample specifically refers to a sample consisting of the target operation image and the expected character recognition result corresponding to the target operation image.

340. Train a set neural network by using the rotated line character training sample, to generate an image character recognition model.

The image character recognition model generation method that is provided in this embodiment of the present disclosure, by first entering set character units into a vertically-oriented character picture generation tool to generate a standard vertically-oriented character image, then rotating the standard vertically-oriented character image as a whole by 90 degrees to generate a rotated line character image as a target operation image, generating the rotated line character training sample by using the set character units as an expected character recognition result corresponding to the target operation image, and finally training a set neural network by using the rotated line character training sample to generate an image character recognition model that can be used for recognizing a vertically-oriented character image, overcomes the technical defect that existing line character images cannot be directly used to train a vertically-oriented character image recognition model, thereby implementing the efficient recognition of vertically-oriented characters.

It should be emphasized again that considering that vertically-oriented images generated by directly using a vertically-oriented character picture generation tool are have similar image formats and if only vertically-oriented images generated by the vertically-oriented character picture generation tool are used as training samples, the training samples lack diversity, in a preferred implementation of this embodiment, first, a particular number of rotated line character training samples are generated by using the method of the second embodiment; then a particular number of rotated line character training samples are generated by using the method of the third embodiment; the two are combined into rotated line character training samples.

Fourth Embodiment

Figure 4:
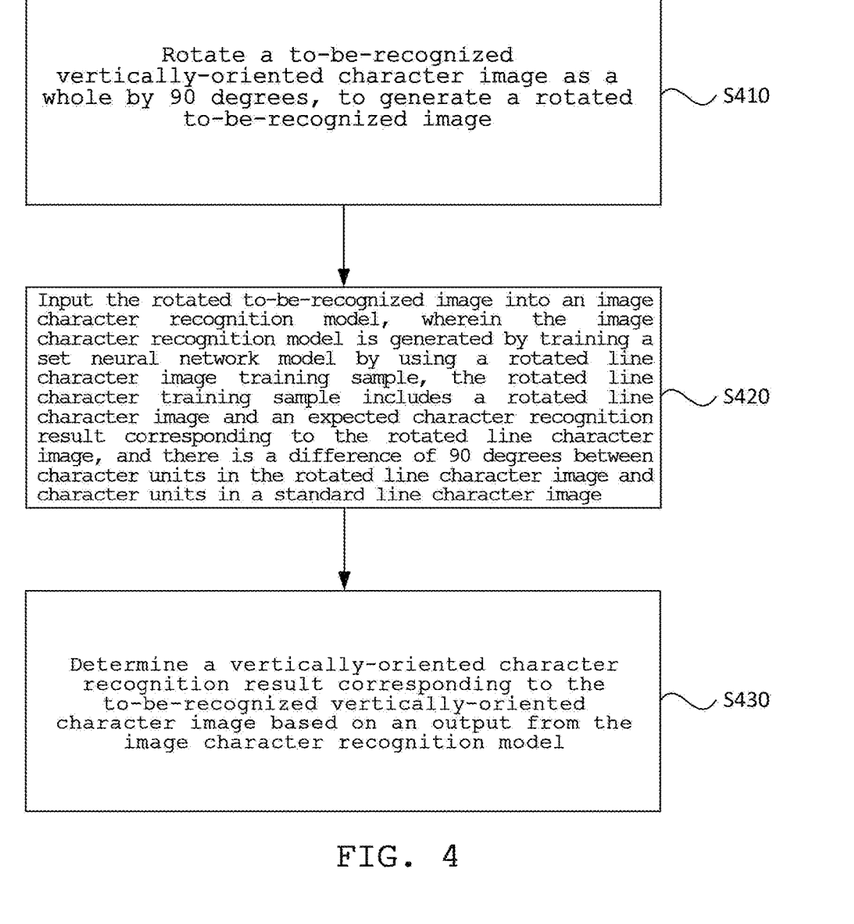
FIG. 4 is a flow chart of a vertically-oriented character image recognition method according to a fourth embodiment of the present disclosure.

FIG. 4 is a flow chart of a vertically-oriented character image recognition method according to a fourth embodiment of the present disclosure. The method of this embodiment may be executed by a vertically-oriented character image recognition apparatus. The apparatus may be implemented through hardware and/or software, and may generally be integrated in a device for performing image character recognition, for example, a smart phone, a computer, or a tablet, which is not limited in this embodiment.

The method of this embodiment specifically includes the following steps:

410. Rotate a to-be-recognized vertically-oriented character image as a whole by 90 degrees, to generate a rotated to-be-recognized image.

In this embodiment, the to-be-recognized vertically-oriented character image specifically refers to an image including one or more vertically arranged character units.

In this embodiment, the rotating the to-be-recognized vertically-oriented character image as a whole by 90 degrees may specifically be rotating the to-be-recognized vertically-oriented character image clockwise or anticlockwise by 90 degrees, which is not limited in this embodiment.

420. Input the rotated to-be-recognized image into an image character recognition model, wherein the image character recognition model is generated by training a set neural network model by using a rotated line character image training sample, the rotated line character training sample includes a rotated line character image and an expected character recognition result corresponding to the rotated line character image, and there is a difference of 90 degrees between character units in the rotated line character image and character units in a standard line character image.

In this embodiment, the input image format of the image character recognition model may specifically be JPG, BMP, or GIF, which is not limited in this embodiment.

430. Determine a vertically-oriented character recognition result corresponding to the to-be-recognized vertically-oriented character image based on an output from the image character recognition model.

In this embodiment, the output result of the image character recognition model specifically refers to a horizontally placed character string corresponding one-to-one to characters in the rotated to-be-recognized image.

In this embodiment, the determining a vertically-oriented character recognition result corresponding to the to-be-recognized vertically-oriented character image specifically refers to determining corresponding positions, in the vertically-oriented character recognition result, of characters in the recognition result of the rotated to-be-recognized image. The determining a vertically-oriented character recognition result corresponding to the to-be-recognized vertically-oriented character image may specifically be determining the vertically-oriented character recognition result corresponding to the to-be-recognized vertically-oriented character image based on a correspondence relationship between the positions of the characters in the output result of the image character recognition model and the positions of the characters in the rotated to-be-recognized image and a correspondence relationship between the positions of the characters in the rotated to-be-recognized image and the positions of the characters in the to-be-recognized vertically-oriented character image.

The vertically-oriented character image recognition method that is provided in this embodiment of the present disclosure, by first rotating a to-be-recognized vertically-oriented character image as a whole by 90 degrees to generate a rotated to-be-recognized image, then entering the rotated to-be-recognized image to an image character recognition model that is generated by training a set neural network model by using a rotated line character image training sample, and finally determining a vertically-oriented character recognition result corresponding to the to-be-recognized vertically-oriented character image based on an output from the image character recognition model, overcomes the technical defect that existing line character images cannot be directly used to train a vertically-oriented character image recognition model, thereby implementing the efficient recognition of vertically-oriented characters.

A further improvement is made on the basis of the above-mentioned embodiment. Preferably, before the entering the rotated to-be-recognized image into an image character recognition model, the method further includes: performing size normalization processing on the rotated to-be-recognized image based on model parameters of the image character recognition model.

The advantage of such configuration lies in that the size of character images that can be accurately recognized by the image character recognition model is fixed, that is, in order that the image character recognition model can accurately recognize a character image, the character image should be converted into a size that can be recognized by the image character recognition model before entering the character image into the image character recognition model. Whereby, the image character recognition model can recognize the to-be-recognized vertically-oriented character image more accurately.

Fifth Embodiment

Figure 5:
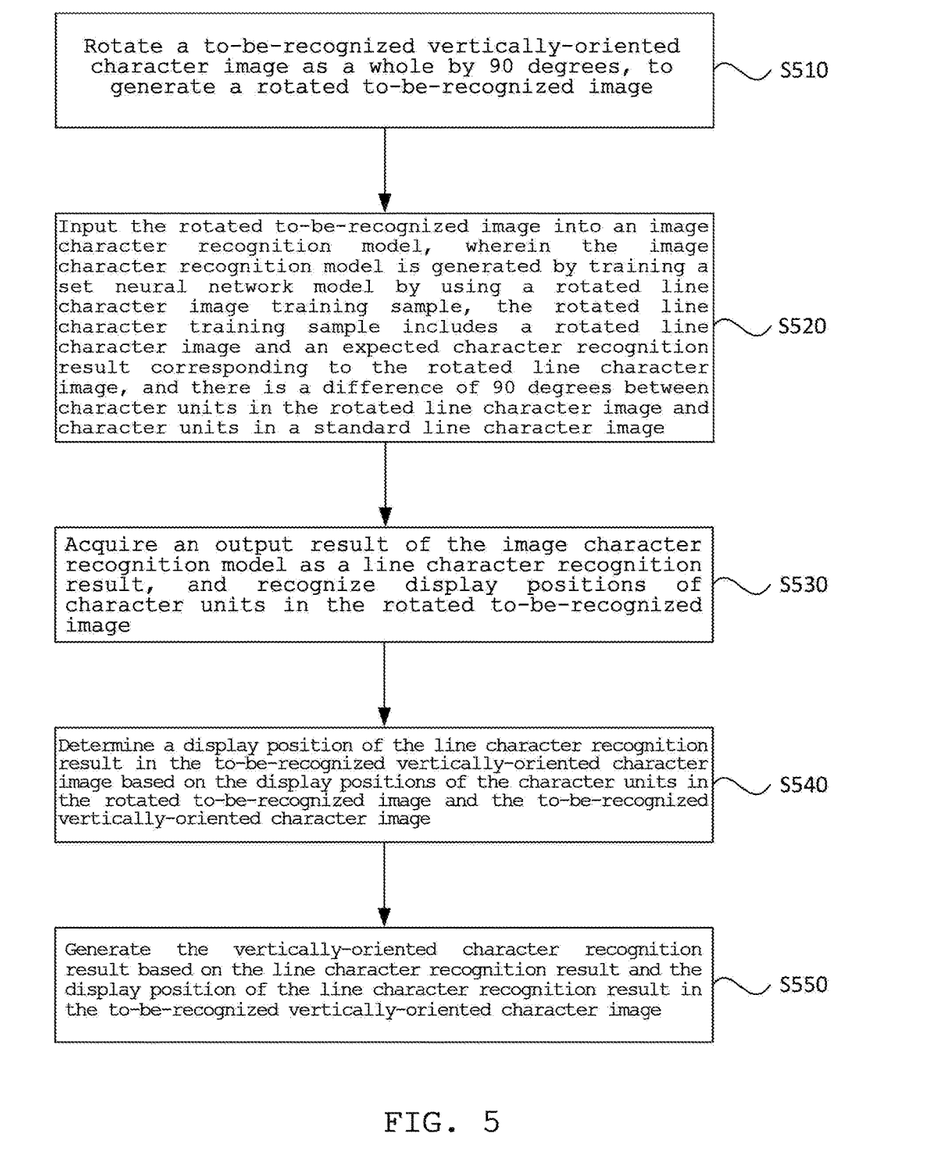
FIG. 5 is a flow chart of a vertically-oriented character image recognition method according to a fifth embodiment of the present disclosure.

FIG. 5 is a flowchart of a vertically-oriented character image recognition method according to a fifth embodiment of the present disclosure. This embodiment is an improvement on the above-mentioned embodiment. In this embodiment, preferably, the determining a vertically-oriented character recognition result corresponding to the to-be-recognized vertically-oriented character image based on an output from the image character recognition model specifically includes: acquiring an output result of the image character recognition model as a line character recognition result, and recognizing display positions of character units in the rotated to-be-recognized image; determining a display position of the line character recognition result in the to-be-recognized vertically-oriented character image based on the display positions of the character units in the rotated to-be-recognized image and the to-be-recognized vertically-oriented character image; and generating the vertically-oriented character recognition result based on the line character recognition result and the display position of the line character recognition result in the to-be-recognized vertically-oriented character image.

Correspondingly, the method of this embodiment specifically includes the following steps:

510. Rotate a to-be-recognized vertically-oriented character image as a whole by 90 degrees, to generate a rotated to-be-recognized image.

520. Input the rotated to-be-recognized image into an image character recognition model, wherein the image character recognition model is generated by training a set neural network model by using a rotated line character image training sample, the rotated line character training sample includes a rotated line character image and an expected character recognition result corresponding to the rotated line character image, and there is a difference of 90 degrees between character units in the rotated line character image and character units in a standard line character image.

530. Acquire an output result of the image character recognition model as a line character recognition result, and recognize display positions of character units in the rotated to-be-recognized image.

In this embodiment, the recognizing display positions of character units in the rotated to-be-recognized image specifically refers to determining specific pixel positions of four vertices of each character unit in the rotated to-be-recognized image.

540. Determine a display position of the line character recognition result in the to-be-recognized vertically-oriented character image based on the display positions of the character units in the rotated to-be-recognized image and the to-be-recognized vertically-oriented character image.

In this embodiment, because there is a fixed correspondence relationship between the display positions of the character units in the rotated to-be-recognized image and the display positions of the character units in the to-be-recognized vertically-oriented character image and there is also a fixed correspondence relationship between the display positions of the character units in the line character recognition result and the display positions of the character units in the rotated to-be-recognized image, a correspondence relationship between the display positions of the character units in the line character recognition result and the display positions of the character units in the to-be-recognized vertically-oriented character image can be determined based on the above-mentioned two correspondence relationships, and finally the display position of the line character recognition result in the to-be-recognized vertically-oriented character image can be determined.

550. Generate the vertically-oriented character recognition result based on the line character recognition result and the display position of the line character recognition result in the to-be-recognized vertically-oriented character image.

In this embodiment, the vertically-oriented character recognition result specifically refers to a character string including one or more vertically arranged characters. The including one or more vertically arranged characters correspond one-to-one to the to-be-recognized vertically-oriented character image.

The vertically-oriented character image recognition method that is provided in this embodiment of the present disclosure, by first acquiring an output result of the image character recognition model as a line character recognition result and recognizing display positions of character units in the rotated to-be-recognized image, determining a display position of the line character recognition result in the to-be-recognized vertically-oriented character image based on the display positions of the character units in the rotated to-be-recognized image and the to-be-recognized vertically-oriented character image, and generating the vertically-oriented character recognition result based on the line character recognition result and the display position of the line character recognition result in the to-be-recognized vertically-oriented character image, overcomes the technical defect that existing line character images cannot be directly used to train a vertically-oriented character image recognition model, thereby implementing the efficient recognition of vertically-oriented characters.

Sixth Embodiment

Figure 6:
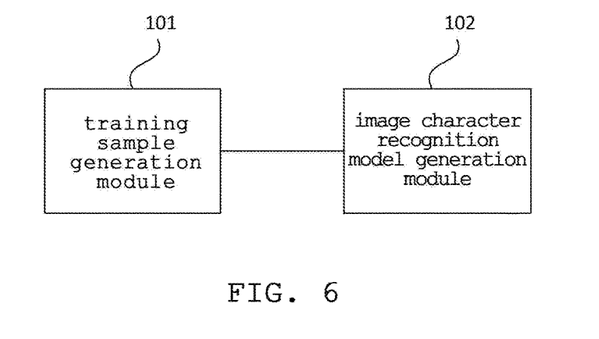
FIG. 6 is a structural diagram of an image character recognition model generation apparatus according to a sixth embodiment of the present disclosure.

FIG. 6 shows an image character recognition model generation apparatus according to a sixth embodiment of the present disclosure. As shown in FIG. 6, the apparatus includes: a training sample generation module 101 and an image character recognition model generation module 102.

The training sample generation module 101 is used for generating a rotated line character training sample, wherein the rotated line character training sample includes a rotated line character image and an expected character recognition result corresponding to the rotated line character image, and there is a difference of 90 degrees between character units in the rotated line character image and character units in a standard line character image.

The image character recognition model generation module 102 is used for training a set neural network by using the rotated line character training sample, to generate an image character recognition model.

The image character recognition model generation apparatus that is provided in this embodiment of the present disclosure, by first generating a rotated line character image, of which character units have a difference of 90 degrees from character units in a standard line character image, then obtaining a rotated line character image training sample, and training a set neural network to generate an image character recognition model so that the image character recognition model can be used for recognizing a vertically-oriented character image, overcomes the technical defect that existing line character images cannot be directly used to train a vertically-oriented character image recognition model, thereby implementing the efficient recognition of vertically-oriented characters.

On the basis of the foregoing embodiments, the character units may include at least one of the following: Chinese characters, Japanese characters, English letters, or numerals.

On the basis of the foregoing embodiments, the training sample generation module may include:

a target operation image acquiring unit for acquiring a standard line character image from a standard line character image sample as a target operation image;

a character unit picture set generation unit for cropping the target operation image based on an indication position of each character unit in the target operation image, and generating a set of character unit pictures corresponding to the character units in the target operation image;

a character unit picture rotating unit for rotating character unit pictures in the set of character unit pictures by 90 degrees respectively;

a rotated line character image generation unit for splicing the rotated character unit pictures based on the cropping order, to generate a rotated line character image; and a rotated line character training sample generation unit for generating the rotated line character training sample based on the rotated line character image generated through splicing and an expected character recognition result corresponding to the target operation image.

On the basis of the foregoing embodiments, the training sample generation module may include:

a standard vertically-oriented character image generation unit for entering set character units into a vertically-oriented character picture generation tool, to generate a standard vertically-oriented character image;

a vertically-oriented character target operation image generation unit for rotating the standard vertically-oriented character image as a whole by 90 degrees, to generate a rotated line character image as a target operation image; and a vertically-oriented character training sample generation unit for generating the rotated line character training sample by using the set character units as an expected character recognition result corresponding to the target operation image.

On the basis of the foregoing embodiments, the 90-degree rotation may include a 90-degree clockwise rotation and/or a 90-degree anticlockwise rotation; and the set neural network includes a recursive neural network.

The image character recognition model generation apparatus provided in this embodiment of the present disclosure can be used to execute the image character recognition model generation methods provided in the first embodiment to the third embodiment of the present disclosure, have corresponding functional modules, and can achieve the same beneficial effects.

Seventh Embodiment

Figure 7:
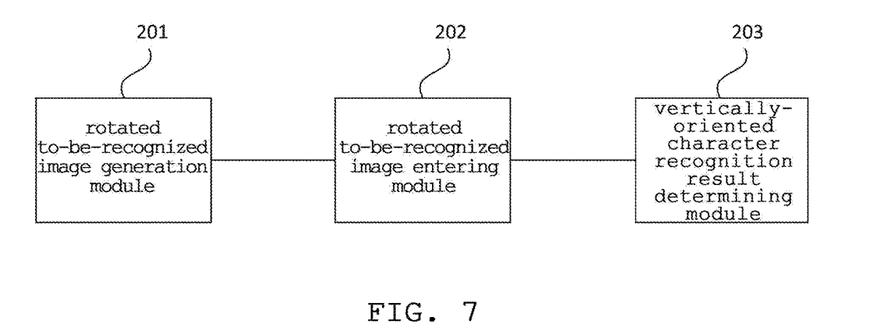
FIG. 7 is a structural diagram of a vertically-oriented character image recognition apparatus according to a seventh embodiment of the present disclosure.

FIG. 7 is a structural diagram of a vertically-oriented character image recognition apparatus according to a seventh embodiment of the present disclosure. As shown in FIG. 7, the apparatus includes: a rotated to-be-recognized image generation module 201, a rotated to-be-recognized image entering module 202, and a vertically-oriented character recognition result determining module 203.

The rotated to-be-recognized image generation module 201 is used for rotating a to-be-recognized vertically-oriented character image as a whole by 90 degrees, to generate a rotated to-be-recognized image.

The rotated to-be-recognized image entering module 202 is used for entering the rotated to-be-recognized image into an image character recognition model, wherein the image character recognition model is generated by training a set neural network model by using a rotated line character image training sample, the rotated line character training sample includes a rotated line character image and an expected character recognition result corresponding to the rotated line character image, and there is a difference of 90 degrees between character units in the rotated line character image and character units in a standard line character image.

The vertically-oriented character recognition result determining module 203 is used for determining a vertically-oriented character recognition result corresponding to the to-be-recognized vertically-oriented character image based on an output from the image character recognition model.

The vertically-oriented character image recognition apparatus that is provided in this embodiment of the present disclosure, by first rotating a to-be-recognized vertically-oriented character image as a whole by 90 degrees to generate a rotated to-be-recognized image, then entering the rotated to-be-recognized image to an image character recognition model that is generated by training a set neural network model by using a rotated line character image training sample, and finally determining a vertically-oriented character recognition result corresponding to the to-be-recognized vertically-oriented character image based on an output from the image character recognition model, overcomes the technical defect that existing line character images cannot be directly used to train a vertically-oriented character image recognition model, thereby implementing the efficient recognition of vertically-oriented characters.

On the basis of the foregoing embodiments, before the rotated to-be-recognized image entering module, the apparatus may further include:

an image size normalization module for performing size normalization processing on the rotated to-be-recognized image based on model parameters of the image character recognition model.

On the basis of the foregoing embodiments, the vertically-oriented character recognition result determining module may include:

a character unit display position recognition unit for acquiring an output result of the image character recognition model as a line character recognition result, and recognizing display positions of character units in the rotated to-be-recognized image;

a line character recognition result display position determining unit for determining a display position of the line character recognition result in the to-be-recognized vertically-oriented character image based on the display positions of the character units in the rotated to-be-recognized image and the to-be-recognized vertically-oriented character image; and a vertically-oriented character recognition result generation unit for generating the vertically-oriented character recognition result based on the line character recognition result and the display position of the line character recognition result in the to-be-recognized vertically-oriented character image.

The vertically-oriented character image recognition apparatus provided in this embodiment of the present disclosure can be used to execute the vertically-oriented character image recognition methods provided in the fourth embodiment to the fifth embodiment of the present disclosure, have corresponding functional modules, and can achieve the same beneficial effects.

Apparently, it should be understood by those skilled in the art that the above mentioned modules or steps of the present disclosure may be implemented by a server. Optionally, the embodiments of the present disclosure may be implemented by a computer executable program, and therefore may be stored in a storage device and executed by a processor. The program may be stored in a computer readable storage medium. The above mentioned storage medium may be a read-only memory, a magnetic disk, an optical disc, and so on. Alternatively, the embodiments of the present disclosure may be fabricated into various integrated circuit modules, or multiple modules or steps in the embodiments of the present disclosure may be fabricated into a single integrated circuit module. As such, the present disclosure is not limited to any particular combination of hardware and software.

The above descriptions are merely preferred embodiments of the present disclosure and not used for limiting the present disclosure. Various modifications and changes may be made to the present disclosure by those skilled in the art. Any modifications, equivalent replacements, and improvements made without departing from the spirit and principle of the present disclosure shall fall within the scope of protection of the present disclosure.

What is claimed is:

1. A method for generating an image character recognition model, comprising:

generating a rotated line character training sample, the rotated line character training sample comprising a rotated line character image and an expected character recognition result corresponding to the rotated line character image, character units in the rotated line character image rotated by 90 degrees in relation to character units in a standard line character image; and training a set neural network by using the rotated line character training sample, to generate an image character recognition model, wherein the generating a rotated line character training sample comprises:

acquiring a standard line character image from a standard line character image sample as a target operation image, cropping the target operation image based on an indication position of each character unit in the target operation image, and generating a set of character unit pictures corresponding to the character units in the target operation image, rotating each of the character unit pictures in the set of the character unit pictures by 90 degrees respectively, splicing the rotated character unit pictures based on the cropping order, to generate a rotated line character image, and generating the rotated line character training sample based on the rotated line character image generated through splicing and an expected character recognition result corresponding to the target operation image.

2. The method according to claim 1, wherein the character units include at least one of the following: Chinese characters, Japanese characters, English letters, and numerals.

3. The method according to claim 1, wherein the generating a rotated line character training sample comprises:

entering set character units into a vertically-oriented character picture generation tool, to generate a standard vertically-oriented character image;

rotating the standard vertically-oriented character image as a whole by 90 degrees, to generate a rotated line character image as a target operation image; and generating the rotated line character training sample by using the set character units as an expected character recognition result corresponding to the target operation image.

4. The method according to claim 3, wherein the 90-degree rotation comprises a 90-degree clockwise rotation and/or a 90-degree anticlockwise rotation; and the set neural network comprises a recursive neural network.

5. The method according to claim 1, wherein the 90-degree rotation comprises a 90-degree clockwise rotation and/or a 90-degree anticlockwise rotation; and the set neural network comprises a recursive neural network.

6. A vertically-oriented character image recognition method, comprising:
  rotating a to-be-recognized vertically-oriented character image as a whole by 90 degrees, to generate a rotated to-be-recognized image;
  entering the rotated to-be-recognized image into an image character recognition model, the image character recognition model generated by training a set neural network model by using a rotated line character training sample, the rotated line character training sample comprising a rotated line character image and an expected character recognition result corresponding to the rotated line character image, character units in the rotated line character image rotated by 90 degrees in relation to character units in a standard line character image; and
  determining a vertically-oriented character recognition result corresponding to the to-be-recognized vertically-oriented character image based on an output from the image character recognition model,
  wherein the rotated line character training sample is generated by:
    acquiring a standard line character image from a standard line character image sample as a target operation image,
    cropping the target operation image based on an indication position of each character unit in the target operation image, and generating a set of character unit pictures corresponding to the character units in the target operation image,
    rotating each of the character unit pictures in the set of the character unit pictures by 90 degrees respectively,
    splicing the rotated character unit pictures based on the cropping order, to generate a rotated line character image, and
    generating the rotated line character training sample based on the rotated line character image generated through splicing and an expected character recognition result corresponding to the target operation image.

7. The method according to claim 6, wherein before the entering the rotated to-be-recognized image into an image character recognition model, the method further comprises:
  performing size normalization on the rotated to-be-recognized image based on model parameters of the image character recognition model.

8. The method according to claim 6, wherein the determining a vertically-oriented character recognition result corresponding to the to-be-recognized vertically-oriented character image based on an output from the image character recognition model comprises:
  acquiring an output result of the image character recognition model as a line character recognition result, and recognizing display positions of character units in the rotated to-be-recognized image;
  determining a display position of the line character recognition result in the to-be-recognized vertically-oriented character image based on the display positions of the character units in the rotated to-be-recognized image and the to-be-recognized vertically-oriented character image; and
  generating the vertically-oriented character recognition result based on the line character recognition result and the display position of the line character recognition result in the to-be-recognized vertically-oriented character image.

9. An image character recognition model generation apparatus, comprising:
  at least one processor; and
  a memory storing instructions, the instructions when executed by the at least one processor, cause the at least one processor to perform operations, the operations comprising:
    generating a rotated line character training sample, the rotated line character training sample comprising a rotated line character image and an expected character recognition result corresponding to the rotated line character image, character units in the rotated line character image rotated by 90 degrees in relation to character units in a standard line character image; and
    training a set neural network by using the rotated line character training sample, to generate an image character recognition model,
  wherein the generating a rotated line character training sample comprises:
    acquiring a standard line character image from a standard line character image sample as a target operation image,
    cropping the target operation image based on an indication position of each character unit in the target operation image, and generating a set of character unit pictures corresponding to the character units in the target operation image,
    rotating each of the character unit pictures in the set of the character unit pictures by 90 degrees respectively,
    splicing the rotated character unit pictures based on the cropping order, to generate a rotated line character image, and
    generating the rotated line character training sample based on the rotated line character image generated through splicing and an expected character recognition result corresponding to the target operation image.

10. The apparatus according to claim 9, wherein the character units include at least one of the following: Chinese characters, Japanese characters, English letters, and numerals.

11. The apparatus according to claim 9, wherein the generating a rotated line character training sample comprises:
  entering set character units into a vertically-oriented character picture generation tool, to generate a standard vertically-oriented character image;
  rotating the standard vertically-oriented character image as a whole by 90 degrees, to generate a rotated line character image as a target operation image; and
  generating the rotated line character training sample by using the set character units as an expected character recognition result corresponding to the target operation image.

12. The apparatus according to claim 11, wherein the 90-degree rotation comprises a 90-degree clockwise rotation and/or a 90-degree anticlockwise rotation; and
  the set neural network comprises a recursive neural network.

13. The apparatus according to claim 9, wherein the 90-degree rotation comprises a 90-degree clockwise rotation and/or a 90-degree anticlockwise rotation; and the set neural network comprises a recursive neural network.

14. A vertically-oriented character image recognition apparatus, comprising:
   at least one processor; and
   a memory storing instructions, the instructions when executed by the at least one processor, cause the at least one processor to perform operations, the operations comprising:
      rotating a to-be-recognized vertically-oriented character image as a whole by 90 degrees, to generate a rotated to-be-recognized image;
      entering the rotated to-be-recognized image into an image character recognition model, the image character recognition model generated by training a set neural network model by using a rotated line character training sample, the rotated line character training sample comprising a rotated line character image and an expected character recognition result corresponding to the rotated line character image, character units in the rotated line character image rotated by 90 degrees in relation to character units in a standard line character image; and
      determining a vertically-oriented character recognition result corresponding to the to-be-recognized vertically-oriented character image based on an output from the image character recognition model,
   wherein the rotated line character training sample is generated by:
      acquiring a standard line character image from a standard line character image sample as a target operation image,
      cropping the target operation image based on an indication position of each character unit in the target operation image, and generating a set of character unit pictures corresponding to the character units in the target operation image,
      rotating each of the character unit pictures in the set of the character unit pictures by 90 degrees respectively,
      splicing the rotated character unit pictures based on the cropping order, to generate a rotated line character image, and
      generating the rotated line character training sample based on the rotated line character image generated through splicing and an expected character recognition result corresponding to the target operation image.

15. The apparatus according to claim 14, wherein before the entering the rotated to-be-recognized image into an image character recognition model, the operations further comprise:
   performing size normalization on the rotated to-be-recognized image based on model parameters of the image character recognition model.

16. The apparatus according to claim 14, wherein the determining a vertically-oriented character recognition result corresponding to the to-be-recognized vertically-oriented character image based on an output from the image character recognition model comprises:
   acquiring an output result of the image character recognition model as a line character recognition result, and recognizing display positions of character units in the rotated to-be-recognized image;
   determining a display position of the line character recognition result in the to-be-recognized vertically-oriented character image based on the display positions of the character units in the rotated to-be-recognized image and the to-be-recognized vertically-oriented character image; and
   generating the vertically-oriented character recognition result based on the line character recognition result and the display position of the line character recognition result in the to-be-recognized vertically-oriented character image.

17. A non-transitory computer storage medium storing a computer program, which when executed by one or more processors, cause the one or more processors to perform operations, the operations comprising:
   generating a rotated line character training sample, the rotated line character training sample comprising a rotated line character image and an expected character recognition result corresponding to the rotated line character image, character units in the rotated line character image rotated by 90 degrees in relation to character units in a standard line character image; and
   training a set neural network by using the rotated line character training sample, to generate an image character recognition model,
   wherein the generating a rotated line character training sample comprises:
      acquiring a standard line character image from a standard line character image sample as a target operation image,
      cropping the target operation image based on an indication position of each character unit in the target operation image, and generating a set of character unit pictures corresponding to the character units in the target operation image,
      rotating each of the character unit pictures in the set of the character unit pictures by 90 degrees respectively,
      splicing the rotated character unit pictures based on the cropping order, to generate a rotated line character image; and
      generating the rotated line character training sample based on the rotated line character image generated through splicing and an expected character recognition result corresponding to the target operation image.

\* \* \* \* \*